(12) United States Patent
Gilbert et al.

(10) Patent No.: US 9,770,873 B2
(45) Date of Patent: Sep. 26, 2017

(54) SYSTEM AND METHOD FOR OPTIMIZING COMPOSITE LAMINATE STRUCTURES

(71) Applicant: The Boeing Company, Chicago, IL (US)

(72) Inventors: Anthony K. Gilbert, Tacoma, WA (US); Omid B. Nakhjavani, Mill Creek, WA (US); Shahriar Khosravani, Everett, WA (US); Mohammad Ali Heidari, Bellevue, WA (US); James F. Ackermann, Woodinville, WA (US); Mostafa Rassaian, Bellevue, WA (US); Forouzan Behzadpour, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 14/466,954

(22) Filed: Aug. 22, 2014

(65) Prior Publication Data

US 2016/0052214 A1   Feb. 25, 2016

(51) Int. Cl.
| | |
|---|---|
| *B29C 70/30* | (2006.01) |
| *B29C 70/38* | (2006.01) |
| *G05B 11/01* | (2006.01) |
| *B29L 31/30* | (2006.01) |

(52) U.S. Cl.
CPC .............. *B29C 70/38* (2013.01); *B29C 70/30* (2013.01); *G05B 11/011* (2013.01); *B29L 2031/3076* (2013.01)

(58) Field of Classification Search
None
See application file for complete search history.

(56) References Cited

U.S. PATENT DOCUMENTS

| | | | | |
|---|---|---|---|---|
| 6,799,081 | B1* | 9/2004 | Hale | B29C 70/382 700/118 |
| 9,545,757 | B1* | 1/2017 | Boone | B32B 3/28 |
| 2004/0021597 | A1* | 2/2004 | Dvorak | H01Q 17/008 342/1 |
| 2010/0011580 | A1* | 1/2010 | Brennan | B29C 70/30 29/897.2 |
| 2010/0051167 | A1* | 3/2010 | Hunter | B29C 70/00 156/64 |

(Continued)

*Primary Examiner* — Isaac T Tecklu

(57) ABSTRACT

A system and method for creating an optimized composite laminate structure containing a plurality of plies. The system has a processor and a memory, including an application interface. The application interface, when executed by the processor, is configured to operably: receive an input file having one or more of a maximum number of plies, design variables, material properties, and design constraints; determine an initial layup sequence defining parameters of a fiber orientation angle for each ply, and a total percentage of plies at a given fiber orientation angle; iteratively adjust the parameters, until an optimum set of parameters is obtained that achieves one or more predetermined margins of safety, and that achieves optimization of the composite laminate structure; and generate an output file for creating a layup, according to the parameters. The system further has a layup system for creating the optimized composite laminate structure.

20 Claims, 7 Drawing Sheets

(56) References Cited

U.S. PATENT DOCUMENTS

| | | | |
|---|---|---|---|
| 2011/0259515 A1* | 10/2011 | Rotter | B29C 70/382 |
| | | | 156/285 |
| 2013/0330503 A1* | 12/2013 | Kismarton | B32B 5/12 |
| | | | 428/113 |
| 2014/0288893 A1* | 9/2014 | Blom | G06F 17/5018 |
| | | | 703/1 |
| 2015/0142149 A1* | 5/2015 | Collier | G05B 19/4097 |
| | | | 700/98 |
| 2015/0377839 A1* | 12/2015 | Jack | G01N 29/4472 |
| | | | 702/33 |

* cited by examiner

| FIG. 1A |
|---|
| FIG. 1B |

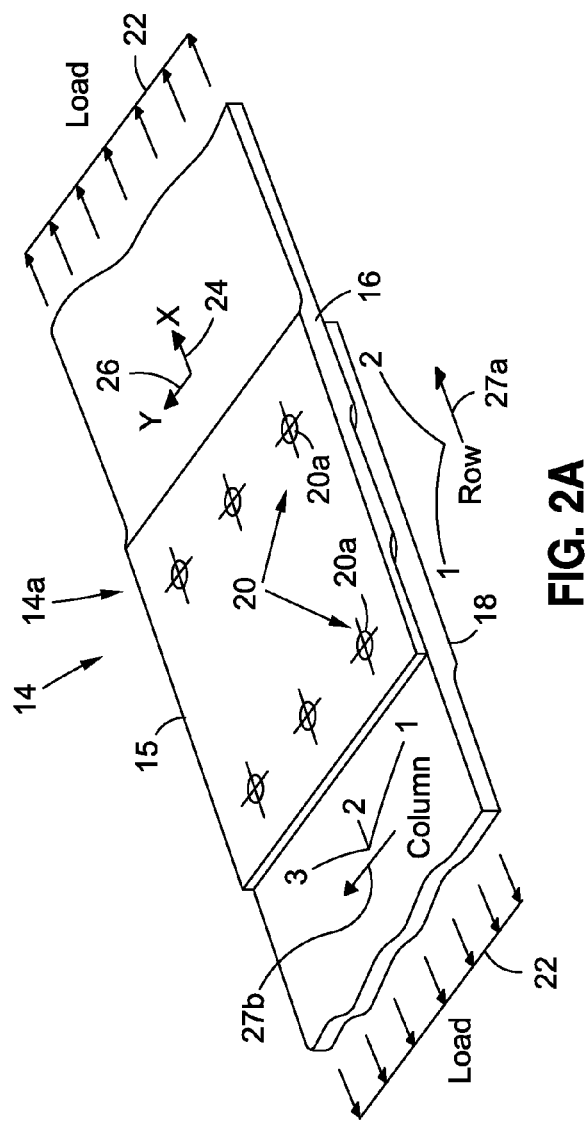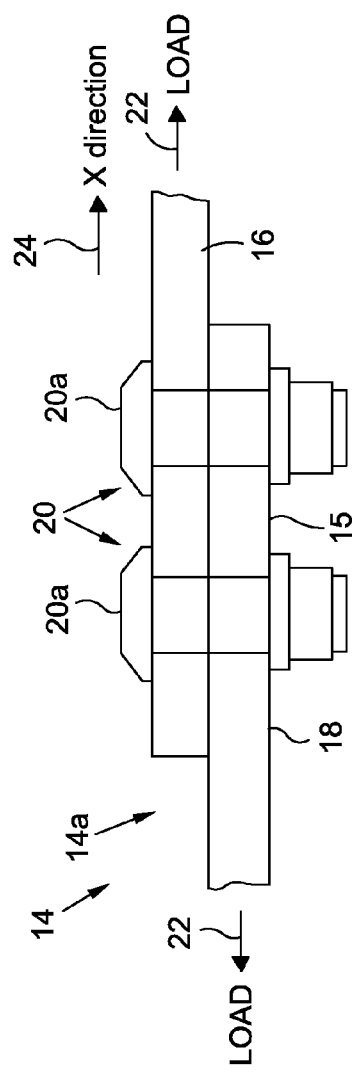
FIG. 2A
FIG. 2B

SYSTEM AND METHOD FOR OPTIMIZING COMPOSITE LAMINATE STRUCTURES

BACKGROUND

1) Field of the Disclosure

The disclosure relates generally to systems and methods for designing and manufacturing composite laminate structures, and more particularly, to non-finite element optimization systems and methods for designing and manufacturing composite laminate structures.

2) Description of Related Art

Composite laminate structures are used in a wide variety of applications, including in the manufacture of component parts for air vehicles, such as aircraft and spacecraft, and other vehicles, such as watercraft, automobiles and trucks, due to their low weight, design flexibility, high strength-to-weight ratios, and other favorable properties. In aircraft design and manufacture, such composite laminate structures are used in increasing quantities to form the fuselage, wings, tail section, skin panels, and other components.

Composite laminate structures may be formed by laminating two or more plies or lamina together, such that the cumulative material properties of the composite laminate structure are superior to the individual material properties of each ply or lamina. Each ply or lamina is an arrangement of unidirectional or bidirectional (e.g., woven fabric) fibers suspended in a matrix material.

A composite laminate structure is formed with a stack of individual plies each having a fiber orientation angle. The stacking sequence of the individual plies in the composite laminate structure may be an important consideration in the design and manufacture of composite laminate structures. Plies having design variables, such as material and fiber orientation and ply thickness, may preferably be oriented and sequenced in an optimal arrangement to provide the optimal structural performance. However, composite laminate structures having additional design variables, such as fiber orientation and ply thickness, may be more challenging to find a global optimum design solution. Finding a global optimum solution plays a key role in having the ability to change the ply or layer sequences and orientations.

Known composite laminate optimization systems and methods exist. However, such known composite laminate optimization systems and methods typically use finite element modeling software utilizing a finite element model (FEM) to optimize layup orientations and sequences to satisfy structural constraints. The use of such finite element modeling software utilizing a finite element model (FEM) for composite laminate optimization may have decreased user friendliness, and may require precision, such as with element size and meshing, to achieve an accurate FEM analysis, which, in turn, may increase time and cost of design and manufacturing. In addition, the use of such finite element modeling software utilizing a finite element model (FEM) for composite laminate optimization may be limited to converging to only a local optimum solution and may not have the ability to converge to a global optimum solution. Moreover, the use of such finite element modeling software utilizing a finite element model (FEM) for composite laminate optimization may be time consuming to converge to obtain an optimization convergence solution. For example, the FEM may take several or more days to converge.

Accordingly, there is a need in the art for an improved system and method for optimizing composite laminate structures that provide advantages over known systems and methods.

SUMMARY

Example implementations of the present disclosure provide an improved system and method for optimizing composite laminate structures to overcome the time-consuming and costly nature of existing solutions. As discussed in the below detailed description, embodiments of the improved system and method for optimizing composite laminate structures may provide significant advantages over existing systems and methods.

In one embodiment there is provided a system for creating an optimized composite laminate structure containing a plurality of plies. The system comprises a processor. The system further comprises a memory in communication with the processor, including an application interface.

The application interface, when executed by the processor, is configured to operably receive an input file comprising one or more of a maximum number of plies, design variables, material properties, and design constraints, for a composite laminate structure containing the plurality of plies. The application interface, when executed by the processor, is further configured to operably determine an initial layup sequence defining parameters comprising a fiber orientation angle for each ply, and a total percentage of plies at a given fiber orientation angle in the composite laminate structure.

The application interface, when executed by the processor, is further configured to operably iteratively adjust the parameters, until an optimum set of parameters is obtained that achieves one or more predetermined margins of safety for the composite laminate structure, and that achieves optimization of the composite laminate structure, resulting in the optimized composite laminate structure. The application interface, when executed by the processor, is further configured to operably generate an output file for creating a layup of the optimized composite laminate structure, according to the parameters.

The system further comprises a layup system configured to operably lay up the plurality of plies for creating the optimized composite laminate structure, according to the output file and the parameters.

In another embodiment there is provided a non-finite element model system for optimizing a composite laminate structure containing a plurality of plies. The system comprises a controller powered by a power element, and the controller comprises a processor and a memory in communication with the processor.

The system further comprises an application interface coupled to the processor, which when executed by the processor, is configured to operably receive an input file comprising one or more of a maximum number of plies, design variables, material properties, and design constraints, for the composite laminate structure. The application interface is further configured to operably determine an initial layup sequence defining parameters comprising a fiber orientation angle for each ply, and a total percentage of plies at a given fiber orientation angle, in the composite laminate structure.

The system further comprises a conversion software which, when executed by the processor, is operable to convert data for the initial layup sequence to an analysis system format. The system further comprises an analysis system configured to operably receive with the application interface the parameters and the data for the initial layup sequence, and iteratively adjust the parameters subject to design constraints comprising less than fifty percent (50%) of the total percentage of plies containing a zero degree (0°)

fiber orientation angle, and less than sixty percent (60%) of the total percentage of plies containing a plus or minus forty-five degree (+/−45°) fiber orientation angle, and more than ten percent (10%) of the total percentage of plies containing a ninety degree (90°) fiber orientation angle, until an optimum set of parameters is obtained that achieves one or more predetermined margins of safety for the composite laminate structure, and that achieves optimization of the composite laminate structure, resulting in an optimized composite laminate structure.

The system further comprises an output file generated by the analysis system for forming a layup of the optimized composite laminate structure, according to the parameters. The system further comprises an automated layup system or a manual layup system configured to operably lay up the plurality of plies for forming the optimized composite laminate structure, according to the output file and the parameters.

In another embodiment there is provided a method executed by a processor for optimizing a composite laminate structure containing a plurality of plies. The method comprises the step of receiving with an application interface executed by the processor, an input file comprising one or more of a maximum number of plies, design variables, material properties, and design constraints, for the composite laminate structure containing the plurality of plies.

The method further comprises the step of determining with the application interface executed by the processor, an initial layup sequence defining parameters comprising a fiber orientation angle for each ply, and a total percentage of plies at a given fiber orientation angle in the composite laminate structure. The method further comprises the step of using with the application interface executed by the processor, an analysis system for iteratively adjusting the parameters, until an optimum set of parameters is obtained that achieves one or more predetermined margins of safety for the composite laminate structure and that achieves optimization of the composite laminate structure, resulting in an optimized composite laminate structure.

The method further comprises the step of generating with the application interface executed by the processor, an output file for creating a layup of the optimized composite laminate structure, according to the parameters. The method further comprises the step of automatically or manually laying up the plurality of plies for creating the layup of the optimized composite laminate structure, according to the output file and the parameters.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2A is an illustration of a perspective view of a layup of composite laminate skins that are optimized using an embodiment of a system of the disclosure;

FIG. 2B is an illustration of a side view of the layup of composite laminate skins of FIG. 2A that are optimized using an embodiment of a system of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figures 1, 1A:
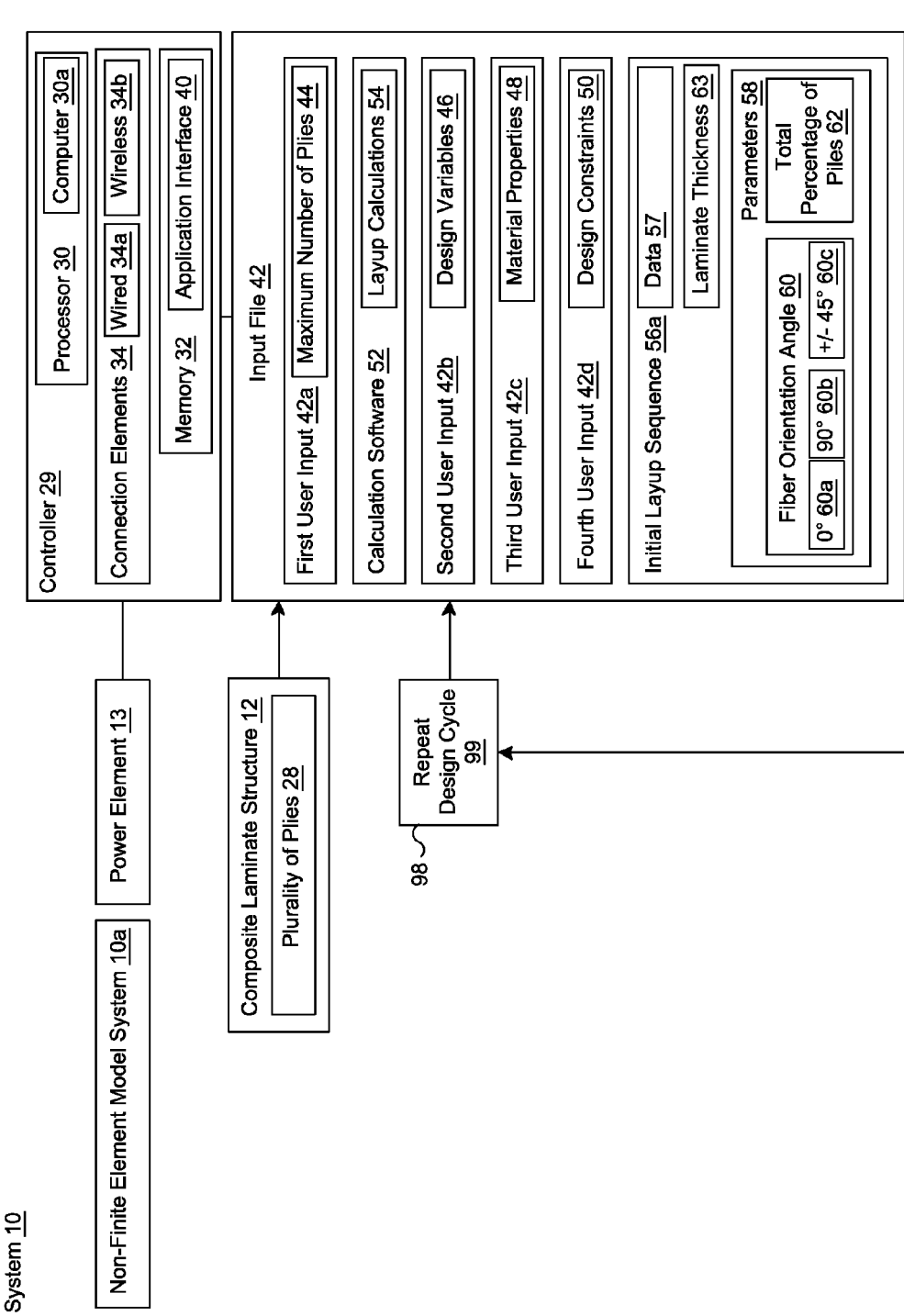
FIG. 1, which includes
FIG. 1A and FIG. 1B, is an illustration of a system flow diagram showing an embodiment of a system of the disclosure.
Figure 1B:
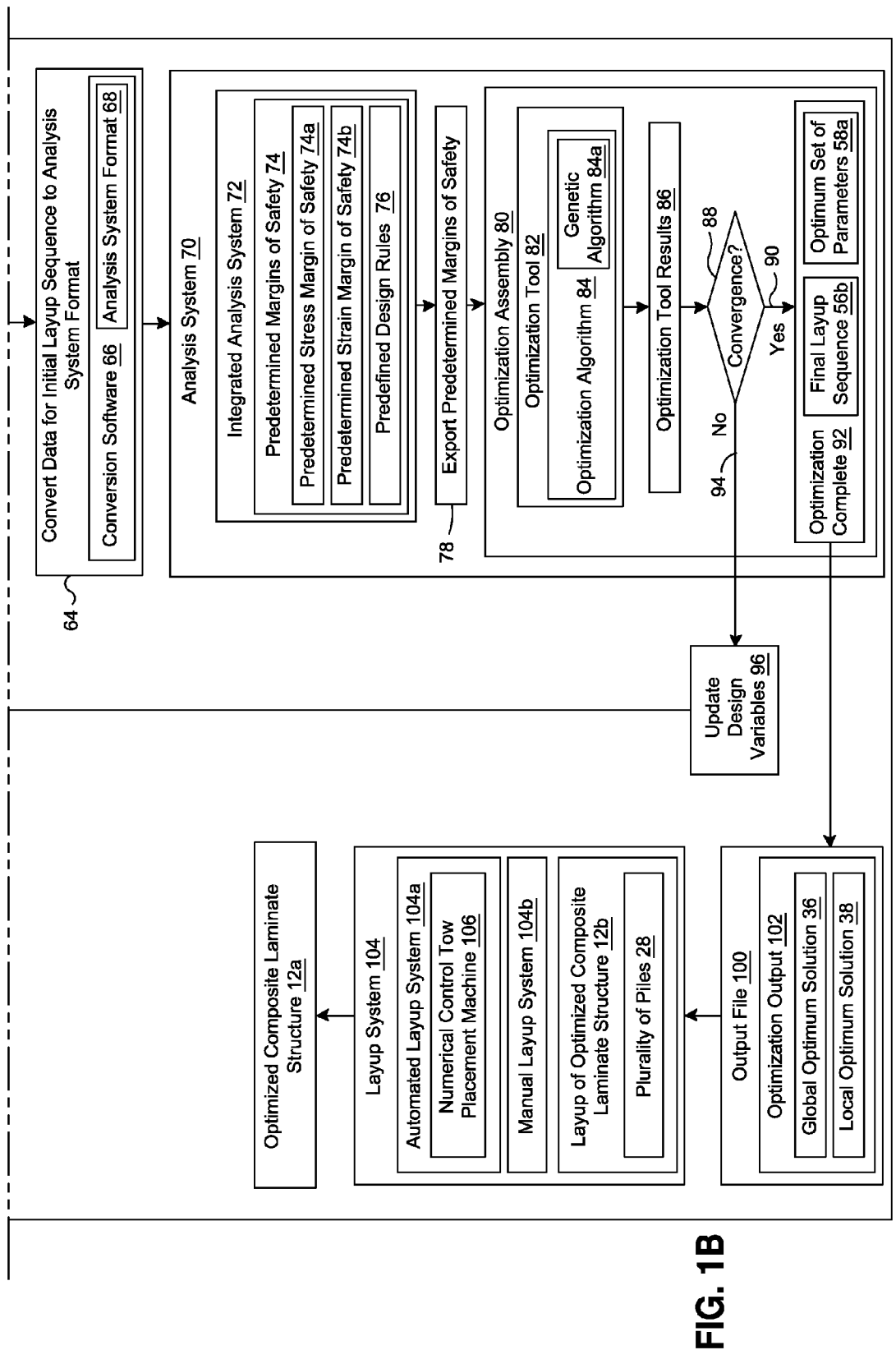

FIG. 1, which includes FIG. 1A and FIG. 1B, is an illustration of a system flow diagram showing an embodiment of the system 10 of the disclosure. In one embodiment of the disclosure, there is provided the system 10 (see FIG. 1 (FIG. 1A)) for creating for a composite laminate structure 12 (see FIG. 1 (FIG. 1A)) an optimized composite laminate structure 12a (see FIG. 1 (FIG. 1B)) containing a plurality of plies 28 (see FIG. 1 (FIG. 1A)). The system 10 (see FIG. 1 (FIG. 1A)) is preferably a non-finite element model (non-FEM) system 10a (see FIG. 1 (FIG. 1A)) that does not require use of a finite element model (FEM). The system 10 (see FIG. 1 (FIG. 1A)) is further preferably automated to find either a global optimum solution 36 (see FIG. 1 (FIG. 1B)) or a local optimum solution 38 (see FIG. 1 (FIG. 1B)) and has the capability of finding either.

The composite laminate structure 12 (see FIG. 1 (FIG. 1A)) preferably comprises a composite laminate skin 14 (see FIGS. 2A-2B). The optimized composite laminate structure 12a (see FIG. 1 (FIG. 1B)) preferably comprises an optimized composite laminate skin 14a (see FIGS. 2A-2B). FIG. 2A is an illustration of a perspective view of a layup 15 of composite laminate skins 14, preferably optimized composite laminate skin 14a, that are optimized using an embodiment of the system 10 (see FIG. 1) of the disclosure. FIG. 2B is an illustration of a side view of the layup 15 of composite laminate skins 14, preferably the optimized composite laminate skins 14a of FIG. 2A, that are optimized using an embodiment of the system 10 (see FIG. 1) of the disclosure.

As shown in FIGS. 2A-2B, the layup 15 of composite laminate skins 14, such as in the form of optimized composite laminate skins 14a, are for a strap 16 and a plate 18, fastened together via one or more fasteners 20, such as in the form of bolts 20a. As further shown in FIGS. 2A-2B, load (P) 22 is applied in an X direction 24 to both the strap 16 and the plate 18. Edge margins for the one or more fasteners 20 (see FIG. 2A) may be calculated for rows 27a (see FIG. 2A), 1 and 2, and columns 27b (see FIG. 2A), 1, 2 and 3.

As shown in FIG. 1 (FIG. 1A), the system 10 comprises a controller 29 having a processor 30, such as in the form of a computer 30a, or other suitable processor. As further shown in FIG. 1 (FIG. 1A), the controller 29 may be powered by one or more power elements 13, such as in the form of batteries, electricity, or other power elements 13. As further shown in FIG. 1 (FIG. 1A), the system 10 further comprises a memory 32 in communication with the processor 30, including an application interface 40.

The application interface 40 (see FIG. 1 (FIG. 1A)) may be connected to the processor 30 (see FIG. 1 (FIG. 1A)) via one or more connection elements 34 (see FIG. 1 (FIG. 1A)), such as a wired connection element 34a (see FIG. 1 (FIG. 1A)) or a wireless connection element 34b (see FIG. 1 (FIG. 1A)). The application interface 40 (see FIG. 1 (FIG. 1A)) may comprise instructions, one or more algorithms, or a combination thereof, and is preferably configured to automatically operably receive an input file 42 (see FIG. 1 (FIG. 1A)) and generate an output file 100 (see FIG. 1 (FIG. 1B)). Preferably, the application interface 40 (see FIG. 1 (FIG. 1A)) is a graphical user interface (GUI) that allows users to interact with electronic devices through graphical icons and visual indicators.

The application interface 40 (see FIG. 1 (FIG. 1A)), when executed by the processor 30 (see FIG. 1 (FIG. 1A)), is configured to operably receive the input file 42 (see FIG. 1 (FIG. 1A)). As shown in FIG. 1 (FIG. 1A), the input file 42 may comprise one or more of a first user input 42a of a maximum number of plies 44, a second user input 42b of design variables 46, a third user input 42c of material properties 48, a fourth user input 42d of design constraints 50, or other suitable user inputs, for the composite laminate structure 12 containing the plurality of plies 28.

It is the decision of a user of the system 10 (see FIG. 1 (FIG. 1A)) or method 150 (see FIG. 4) to define the maximum number of plies 44 (see FIG. 1 (FIG. 1A)) or layers. A calculation software 52 (see FIG. 1 (FIG. 1A)) may be used to calculate or measure the maximum number of plies 44 (see FIG. 1 (FIG. 1A)), to measure the thickness of each ply 28a (see FIG. 3), and to summarize the design variables 46 (see FIG. 1 (FIG. 1A)) of the maximum number of plies 44 (see FIG. 1 (FIG. 1A)) or layers. An example of a calculation software 52 (see FIG. 1 (FIG. 1A)) that may be used with the system 10 (see FIG. 1 (FIG. 1A)) or method 150 (see FIG. 4) disclosed herein includes EXCEL computer software obtained from Microsoft Corporation of Redmond, Wash. (EXCEL is a registered trademark owned by Microsoft Corporation of Redmond, Wash.). However, other suitable calculation software may also be used.

The application interface 40 (see FIG. 1 (FIG. 1A)), when executed by the processor 30 (see FIG. 1 (FIG. 1A)), is preferably further configured to operably determine an initial layup sequence 56a (see FIG. 1 (FIG. 1A)) defining parameters 58 (see FIG. 1 (FIG. 1A)) and measuring laminate thickness 63 (see FIG. 1 (FIG. 1A). As shown in FIG. 1 (FIG. 1A), the parameters 58 preferably comprise a fiber orientation angle 60 for each ply 28a (see FIG. 3), and a total percentage of plies 62 at a given fiber orientation angle 60 in the composite laminate structure 12. The fiber orientation angle 60 (see FIG. 1 (FIG. 1A)) preferably comprises a traditional fiber orientation angle comprising one of a zero degree (0°) fiber orientation angle 60a (see FIG. 1 (FIG. 1A)), a ninety degree (90°) fiber orientation angle 60b (see FIG. 1 (FIG. 1A)), or a plus or minus forty-five degree (+/−45°) fiber orientation angle 60c (see FIG. 1 (FIG. 1A)).

As used herein, "traditional fiber orientation angle" means a fiber orientation angle of zero degrees (0°), ninety degrees (90°), or plus or minus forty-five degrees (+/−45°). As used herein, "non-traditional fiber orientation angle" means a fiber orientation angle other than a fiber orientation angle of zero degrees (0°), ninety degrees (90°), or plus or minus forty-five degrees (+/−45°), for example, a non-traditional fiber orientation angle may be a fiber orientation angle of plus or minus ten degrees (+/−10°), plus or minus twenty degrees (+/−20°), plus or minus thirty degrees (+/−30°), or another suitable fiber orientation angle other than zero degrees (0°), ninety degrees (90°), or plus or minus forty-five degrees (+/−45°).

Figure 3:
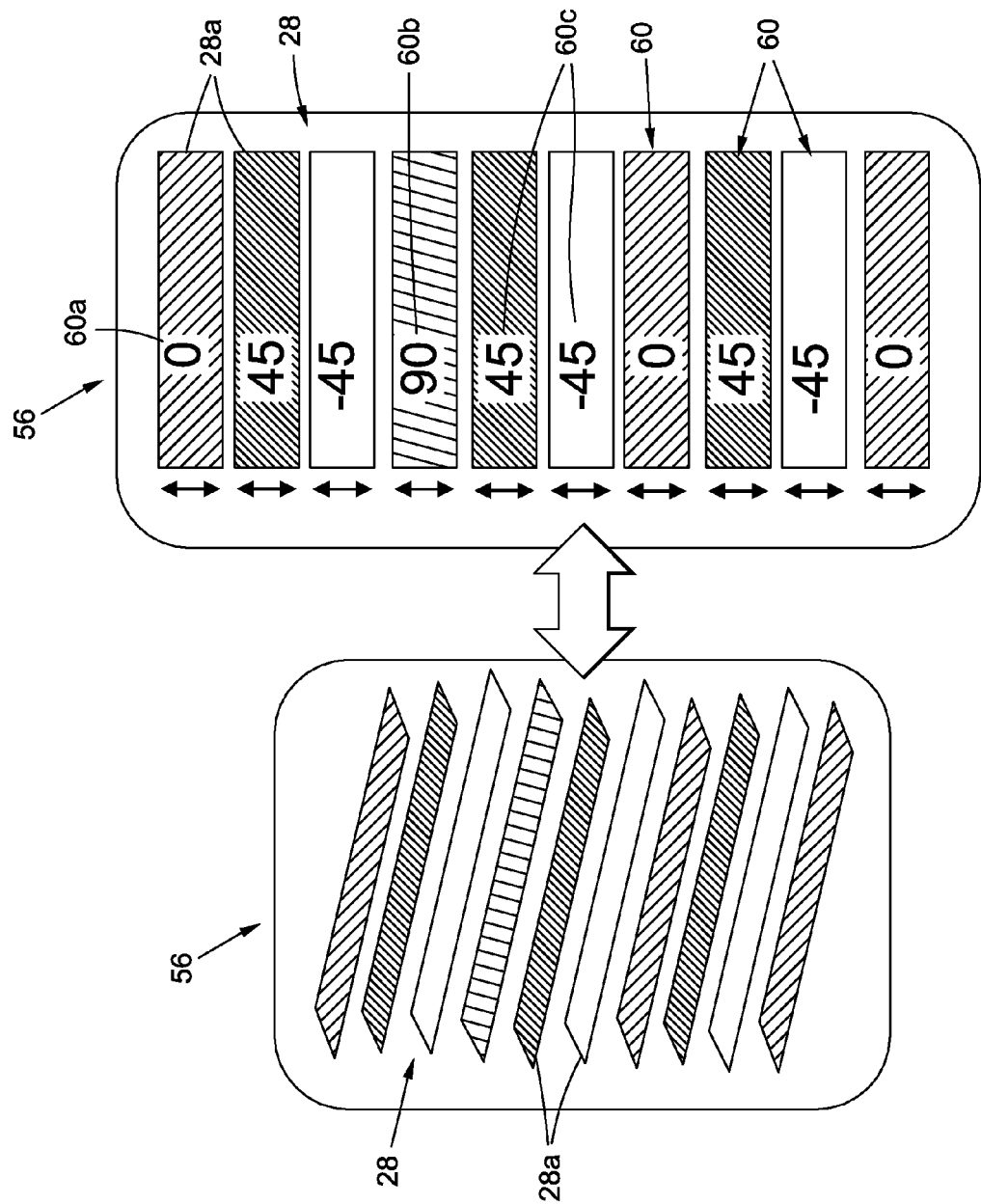
FIG. 3 is an illustration of a schematic diagram of an embodiment of an initial layup sequence of a plurality of plies and a corresponding fiber orientation angle for each individual ply.

FIG. 3 is an illustration of a schematic diagram of an embodiment of a layup sequence 56 of a plurality of plies 28 and a corresponding fiber orientation angle 60 for each individual ply 28a. As shown in FIG. 3, the plurality of plies 28 comprised of individual plies 28a are stacked in the layup sequence 56 having fiber orientation angles 60 comprised of zero degree (0°) fiber orientation angles 60a, a ninety degree (90°) fiber orientation angle 60b, and plus or minus forty-five degree (+/−45°) fiber orientation angles 60c. As further shown in FIG. 3, the layup sequence 56 comprises the following sequence of fiber orientation angles 60: ((0)1/(45)1/(−45)1/(90)1/(45)1/(−45)1/(0)1/(45)1/(−45)1/(0)1).

The system 10 (see FIG. 1 (FIG. 1A)) further preferably comprises a conversion software 66 (see FIG. 1 (FIG. 1A)) which, when executed by the processor 30 (see FIG. 1 (FIG. 1A)), is operable to convert data 57 (see FIG. 1 (FIG. 1A)) for the initial layup sequence 56a (see FIG. 1 (FIG. 1A)) to an analysis system format 68 (see FIG. 1 (FIG. 1B)) for use in an integrated analysis tool 72 (see FIG. 1 (FIG. 1B)) of an analysis system 70 (see FIG. 1 (FIG. 1B). As shown in FIG. 1 (FIG. 1B), action 64 to convert the data 57 (FIG. 1A) for the layup sequence 56 (FIG. 3) to an analysis system format 68 indicates that the conversion software 66 converts the data 57 for the layup sequence 56 (FIG. 3) to an analysis system format 68 prior to the data 57 being analyzed and optimized by the analysis system 70. The conversion software 66 (see FIG. 1 (FIG. 1B)) may comprise a multi-paradigm programming language, such as PYTHON multi-paradigm programming language obtained from the Corporation for National Research Initiatives, Inc. of Washington, D.C. (PYTHON is a registered trademark owned by the Corporation for National Research Initiatives, Inc. of Washington, D.C.). However, other suitable conversion software may also be used.

The application interface 40 (see FIG. 1 (FIG. 1A)), when executed by the processor 30 (see FIG. 1 (FIG. 1A)), is further configured to operably iteratively adjust the parameters 58 (see FIG. 1 (FIG. 1A)), until an optimum set of parameters 58a (see FIG. 1 (FIG. 1B)) is obtained that achieves one or more predetermined margins of safety 74 (see FIG. 1 (FIG. 1B)) for the composite laminate structure 12 (see FIG. 1 (FIG. 1A)), and that achieves optimization of the composite laminate structure 12 (see FIG. 1 (FIG. 1A)), resulting in an optimized composite laminate structure 12a (see FIG. 1 (FIG. 1B)).

The application interface 40 (see FIG. 1 (FIG. 1A)) may further be configured to operably use an analysis system 70 (see FIG. 1 (FIG. 1B)). As shown in FIG. 1 (FIG. 1B), the analysis system 70 comprises an integrated analysis tool 72 configured to operably calculate the one or more predetermined margins of safety 74 for the composite laminate structure 12 (FIG. 1A).

The one or more predetermined margins of safety 74 (see FIG. 1 (FIG. 1B)) calculated by the integrated analysis tool 72 (see FIG. 1 (FIG. 1B)) preferably comprise a predetermined stress margin of safety 74a (see FIG. 1 (FIG. 1B)) and a predetermined strain margin of safety 74b (see FIG. 1 (FIG. 1B)), based on one or more predefined design rules 76 (see FIG. 1 (FIG. 1B)). As shown in FIG. 1 (FIG. 1B), the one or more predetermined margins of safety 74 may be exported to an optimization assembly 80 via action 78 to export predetermined margins of safety 74 to optimization assembly 80. As used herein, "margin of safety" means a value calculated using a known, developed empirical approach or method that predicts failure of a composite laminate structure at a macroscopic level.

As shown in FIG. 1 (FIG. 1B), the analysis system 70 further comprises the optimization assembly 80 having an optimization tool 82 configured to operably receive the one or more exported predetermined margins of safety 74 from the integrated analysis tool 72, to operably achieve optimization of the composite laminate structure 12 (FIG. 1A), and to operably generate the output file 100.

The optimization tool 82 (see FIG. 1 (FIG. 1B)) preferably comprises an optimization algorithm 84 (see FIG. 1 (FIG. 1B)) to obtain optimization tool results 86 (see FIG. 1 (FIG. 1B)) to test for convergence 88 (see FIG. 1 (FIG. 1B)). The optimization algorithm 84 (see FIG. 1 (FIG. 1B)) is preferably a genetic algorithm 84a (see FIG. 1 (FIG. 1B)). The processor 30 (see FIG. 1 (FIG. 1A)) is configured to iteratively adjust the parameters 58 (see FIG. 1 (FIG. 1A)) and calculate one or more margins of safety 74 (see FIG. 1 (FIG. 1B)) (as previously stated), and to test for convergence 88 (see FIG. 1 (FIG. 1B)) to determine if the iterative adjustments and calculated margins of safety have converged to within a predetermined amount or percentage (e.g., within 10% (ten percent)) of a predetermined stress margin of safety 74a (see FIG. 1 (FIG. 1B)) and/or a predetermined strain margin of safety 74b (see FIG. 1 (FIG. 1B)). For illustration purposes, the predetermined (shear) stress margin of safety 74a (see FIG. 1 (FIG. 1B)) may be a minimum margin of safety of 1.3, and the predetermined (fiber) strain margin of safety 74b (see FIG. 1 (FIG. 1B)) may be a minimum margin of safety of 2.0.

As used herein, "genetic algorithm" means an algorithm used in an optimization method or system that is based on a natural selection process that mimics biological evolution, where the algorithm repeatedly modifies a population of individual solutions to evolve toward an optimal solution. An example of an optimization software program with a genetic algorithm that may be used with the system 10 (see FIG. 1 (FIG. 1A)) and method 150 (see FIG. 4) disclosed herein may include MODELCENTER software program that aids in the design and optimization of systems, obtained from Phoenix Integration, Inc. of Blacksburg, Va. (MODELCENTER is a registered trademark owned by Phoenix Integration, Inc. of Blacksburg, Va.). Another example of an optimization software program with a genetic algorithm that may be used with the system 10 (see FIG. 1 (FIG. 1A)) and method 150 (see FIG. 4) disclosed herein may include MATLAB software program obtained from Mathworks, Inc. of Natick, Mass., to analyze data, develop algorithms, and create models and applications. (MATLAB is a registered trademark owned by Mathworks, Inc. of Natick, Mass.). However, other suitable optimization software programs with genetic algorithms may also be used.

As shown in FIG. 1 (FIG. 1B), if convergence 88 is achieved as indicated by a "YES" answer 90, then optimization complete 92 is indicated and the output file 100 is generated. Further, as shown in FIG. 1 (FIG. 1B), if convergence 88 is not achieved as indicated by a "NO" answer 94, then action 96 of update design variables 46 is indicated, and action 98 of repeat design cycle 99 is indicated, and one or more design cycles 99 are repeated until convergence 88 is achieved.

The application interface 40 (see FIG. 1 (see FIG. 1A)) iteratively adjusts the parameters 58 (see FIG. 1 (see FIG. 1A)) subject to design constraints 50 (see FIG. 1 (see FIG. 1A)). The design constraints 50 (see FIG. 1 (see FIG. 1A)) may preferably comprise less than fifty percent (50%) of the total percentage of plies 62 (see FIG. 1 (FIG. 1A)) containing a zero degree (0°) fiber orientation angle 60a (see FIG. 1 (FIG. 1A)), less than sixty percent (60%) of the total percentage of plies 62 (see FIG. 1 (FIG. 1A)) containing a plus or minus forty-five degree (+/−45°) fiber orientation angle 60c (see FIG. 1 (FIG. 1A)), and more than ten percent (10%) of the total percentage of plies 62 (see FIG. 1 (FIG. 1A)) containing a ninety degree (90°) fiber orientation angle 60b (see FIG. 1 (FIG. 1A)). As used herein, each +/− fiber orientation angle or layer combination is a ply 28a (see FIG. 3).

The application interface 40 (see FIG. 1 (FIG. 1A)), when executed by the processor 30 (see FIG. 1 (FIG. 1A)), is further configured to operably generate an output file 100 (see FIG. 1 (FIG. 1B)) for creating a layup of the optimized composite laminate structure 12b (see FIG. 1 (FIG. 1B)), according to the parameters 58 (see FIG. 1 (FIG. 1A)). As shown in FIG. 1 (FIG. 1B), the output file 100 preferably comprises an optimization output 102 comprising the global optimum solution 36 and the local optimum solution 38.

As shown in FIG. 1 (FIG. 1B), the system 10 (FIG. 1A) further comprises a layup system 104 configured to operably lay up the plurality of plies 28 for creating the optimized composite laminate structure 12a, according to the output file 100 and the parameters 58. The layup system 104 (see FIG. 1 (FIG. 1B)) preferably comprises an automated layup system 104a (see FIG. 1 (FIG. 1B)) or a manual layup system 104b (see FIG. 1 (FIG. 1B)). The automated layup system 104 (see FIG. 1 (FIG. 1B)) preferably comprises a numerical control tow placement machine 106 (see FIG. 1 (FIG. 1B)) for creating the layup of the optimized composite laminate structure 12b (see FIG. 1 (FIG. 1B), according to the output file 100 (see FIG. 1 (FIG. 1B)) and the parameters 58 (see FIG. 1 (FIG. 1A)).

In another embodiment there is provided a non-finite element model system 10a (see FIG. 1 (FIG. 1A)) for optimizing a composite laminate structure 12 (see FIG. 1 (FIG. 1A)) containing a plurality of plies 28 (see FIG. 1 (FIG. 1A)). The non-finite element model system 10a (see FIG. 1 (FIG. 1A)) comprises a controller 29 (see FIG. 1 (FIG. 1A)) powered by a power element 13 (see FIG. 1 (FIG. 1A)). The controller 29 (see FIG. 1 (FIG. 1A)) comprises a processor 30 (see FIG. 1 (FIG. 1A)), such as in the form of a computer 30a (see FIG. 1 (FIG. 1A)), and memory 32 (see FIG. 1 (FIG. 1A)) in communication with the processor 30 (see FIG. 1 (FIG. 1A)).

The non-finite element model system 10a (see FIG. 1 (FIG. 1A)) further comprises an application interface 40 (see FIG. 1 (FIG. 1A)) coupled to the processor 30 (see FIG. 1 (FIG. 1A)), which when executed by the processor 30 (see FIG. 1 (FIG. 1A)), is configured to operably receive an input file 42 (see FIG. 1 (FIG. 1A)) comprising one or more of a maximum number of plies 44 (see FIG. 1 (FIG. 1A)), design variables 46 (see FIG. 1 (FIG. 1A)), material properties 48 (see FIG. 1 (FIG. 1A)), and design constraints 50 (see FIG. 1 (FIG. 1A)), for the composite laminate structure 12 (see FIG. 1 (FIG. 1A)). The application interface 40 (see FIG. 1 (FIG. 1A)) is further configured to operably determine an initial layup sequence 56a (see FIG. 1 (FIG. 1A)) defining parameters 58 (see FIG. 1 (FIG. 1A)) comprising a fiber orientation angle 60 (see FIG. 1 (FIG. 1A)) for each ply 28a (see FIG. 3), and a total percentage of plies 62 (see FIG. 1

(FIG. 1A)) at a given fiber orientation angle 60 (see FIG. 1 (FIG. 1A)), in the composite laminate structure 12 (see FIG. 1 (FIG. 1A)).

The non-finite element model system 10a (see FIG. 1 (FIG. 1A)) further comprises a conversion software 66 (see FIG. 1 (FIG. 1B)). The conversion software 66 (see FIG. 1 (FIG. 1B)), discussed above, when executed by the processor 30 (see FIG. 1 (FIG. 1A)), is operable to convert data 57 (see FIG. 1 (FIG. 1A)) for the initial layup sequence 56a (see FIG. 1 (FIG. 1A)) to an analysis system format 68 (see FIG. 1 (FIG. 1B)).

The non-finite element model system 10a (see FIG. 1 (FIG. 1A)) further comprises an analysis system 70 (see FIG. 1 (FIG. 1B)) configured to operably receive with the application interface 40 (see FIG. 1 (FIG. 1A)) the parameters 58 (see FIG. 1 (FIG. 1A)) and the data 57 (see FIG. 1 (FIG. 1A)) for the initial layup sequence 56a (see FIG. 1 (FIG. 1A)), and iteratively adjust the parameters 58 (see FIG. 1 (FIG. 1A)) subject to design constraints 50 (see FIG. 1 (FIG. 1A)). The analysis system 70 (see FIG. 1 (FIG. 1B) comprises an integrated analysis tool 72 (see FIG. 1 (FIG. 1B)) configured to operably calculate the one or more predetermined margins of safety 74 (see FIG. 1 (FIG. 1B)) for the composite laminate structure 12 (see FIG. 1 (FIG. 1A)). The one or more predetermined margins of safety 74 (see FIG. 1 (FIG. 1B)) preferably comprise a predetermined stress margin of safety 74a (see FIG. 1 (FIG. 1B)) and a predetermined strain margin of safety 74b (see FIG. 1 (FIG. 1B), based on one or more predefined design rules 76 (see FIG. 1 (FIG. 1B)).

The analysis system 70 (see FIG. 1 (FIG. 1B)) further comprises an optimization assembly 80 (see FIG. 1 (FIG. 1B)) with an optimization tool 82 (see FIG. 1 (FIG. 1B)) configured to operably receive the one or more predetermined margins of safety 74 (see FIG. 1 (FIG. 1B)) from the integrated analysis tool 72 (see FIG. 1 (FIG. 1B)), to operably achieve optimization of the composite laminate structure 12 (see FIG. 1 (FIG. 1A)), and to operably generate the output file 100 (see FIG. 1 (FIG. 1B)). The optimization tool 82 (see FIG. 1 (FIG. 1B)) comprises an optimization algorithm 84 (see FIG. 1 (FIG. 1B)) to obtain optimization tool results 86 (see FIG. 1 (FIG. 1B)) to test for convergence 88 (see FIG. 1 (FIG. 1B)). If convergence 88 (see FIG. 1 (FIG. 1B)) is achieved, then optimization complete 92 (see FIG. 1 (FIG. 1B)) is indicated, and the output file 100 (see FIG. 1 (FIG. 1B)) is generated. If convergence 88 (see FIG. 1 (FIG. 1B)) is not achieved, then action 96 (see FIG. 1 (FIG. 1B)) of update design variables 46 is indicated, and action 98 (see FIG. 1 (FIG. 1B)) of repeat design cycle 99 (see FIG. 1 (FIG. 1B)) is indicated. One or more design cycles 99 (see FIG. 1 (FIG. 1B)) may be repeated until convergence 88 (see FIG. 1 (FIG. 1B)) is achieved.

The design constraints 50 (see FIG. 1 (FIG. 1A)) preferably comprising less than fifty percent (50%) of the total percentage of plies 62 (see FIG. 1 (FIG. 1A)) containing a zero degree (0°) fiber orientation angle 60a (see FIG. 1 (FIG. 1A)), less than sixty percent (60%) of the total percentage of plies 62 (see FIG. 1 (FIG. 1A)) containing a plus or minus forty-five degree (+/−45°) fiber orientation angle 60c (see FIG. 1 (FIG. 1A)), and more than ten percent (10%) of the total percentage of plies 62 (see FIG. 1 (FIG. 1A)) containing a ninety degree (90°) fiber orientation angle 60b (see FIG. 1 (FIG. 1A)), until an optimum set of parameters 58a (see FIG. 1 (FIG. 1B)) is obtained that achieves one or more predetermined margins of safety 74 (see FIG. 1 (FIG. 1B)) for the composite laminate structure 12 (see FIG. 1 (FIG. 1A)), and that achieves optimization of the composite laminate structure 12 (see FIG. 1 (FIG. 1A)), resulting in an optimized composite laminate structure 12a (see FIG. 1 (FIG. 1B)).

The non-finite element model system 10a (see FIG. 1 (FIG. 1A)) further comprises an output file 100 (see FIG. 1 (FIG. 1B)) generated by the analysis system 70 (see FIG. 1 (FIG. 1B)). The output file 100 (see FIG. 1 (FIG. 1B)) is preferably used for forming a layup of the optimized composite laminate structure 12b (see FIG. 1 (FIG. 1B)), according to the parameters 58 (see FIG. 1 (FIG. 1A)).

The non-finite element model system 10a (see FIG. 1 (FIG. 1A)) further comprises an automated layup system 104a (see FIG. 1 (FIG. 1B)) or a manual layup system 104b (see FIG. 1 (FIG. 1B)). Each of the automated layup system 104a (see FIG. 1 (FIG. 1B)) and the manual layup system 104b (see FIG. 1 (FIG. 1B)) is configured to operably lay up the plurality of plies 28 (see FIG. 1 (FIG. 1B)) for forming the optimized composite laminate structure 12a (see FIG. 1 (FIG. 1B)), according to the output file 100 (see FIG. 1 (FIG. 1B)) and the parameters 58 (see FIG. 1 (FIG. 1A)).

Figure 4:
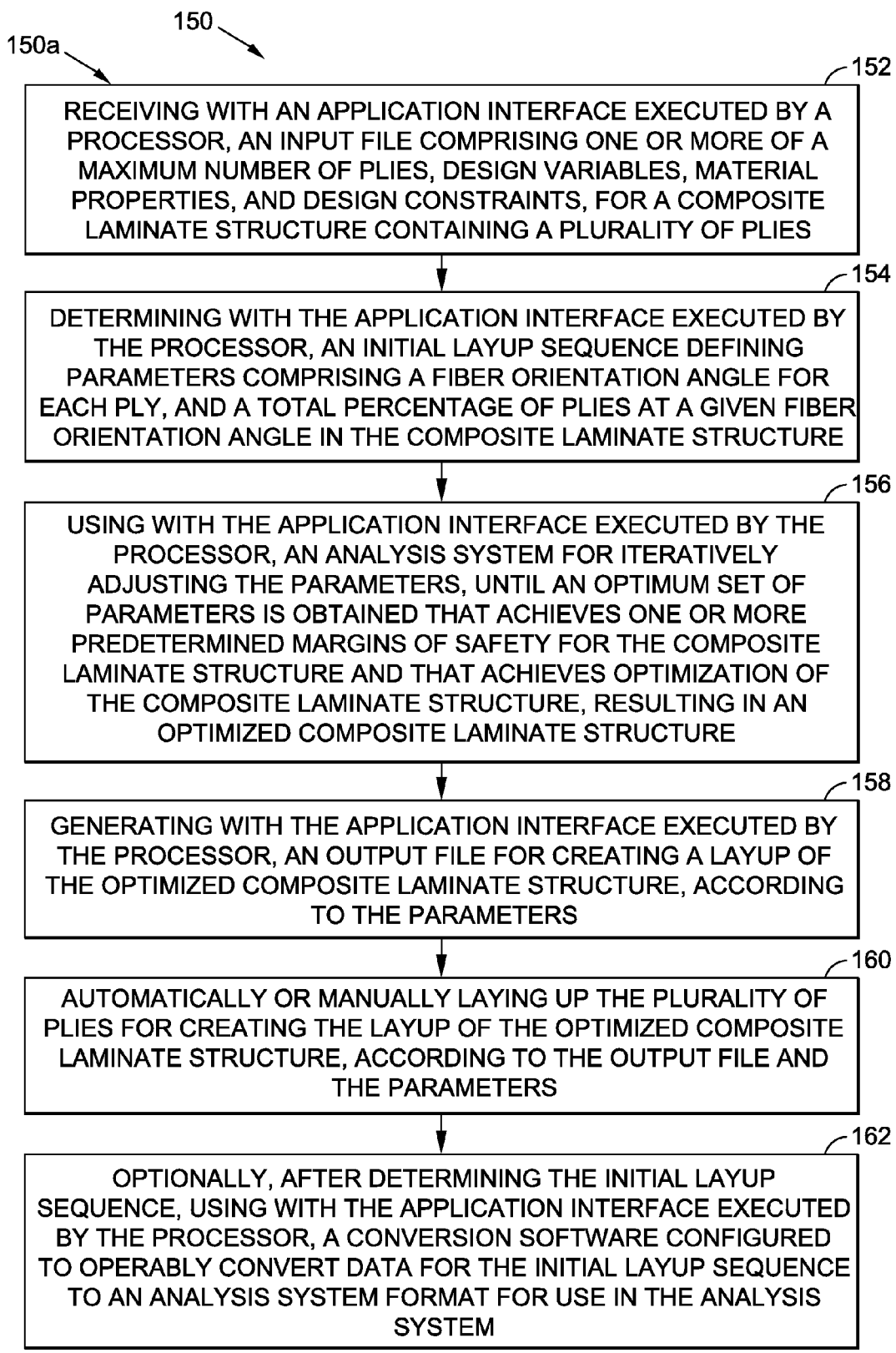
FIG. 4 is an illustration of a flow diagram showing an embodiment of a method of the disclosure.

In another embodiment there is provided a method 150 (see FIG. 4) executed by a processor 30 (see FIG. 1 (FIG. 1A)) for optimizing a composite laminate structure 12 (see FIG. 1 (FIG. 1A)) containing a plurality of plies 28 (see FIG. 1 (FIG. 1A)). FIG. 4 is an illustration of a flow diagram showing an embodiment of the method 150 of the disclosure. The method 150 is preferably a non-finite element model (non-FEM) method 150a (see FIG. 4) that does not require use of a finite element model (FEM). The method 150 (see FIG. 4) is preferably automated to find either a global optimum solution 36 (see FIG. 1 (FIG. 1B)) or a local optimum solution 38 (see FIG. 1 (FIG. 1B)).

As shown in FIG. 4, the method 150 comprises step 152 of receiving with an application interface 40 (see FIG. 1 (FIG. 1A)) executed by the processor 30 (see FIG. 1 (FIG. 1A)), an input file 42 (see FIG. 1 (FIG. 1A)) comprising one or more of a maximum number of plies 44 (see FIG. 1 (FIG. 1A)), design variables 46 (see FIG. 1 (FIG. 1A)), material properties 48 (see FIG. 1 (FIG. 1A)), and design constraints 50 (see FIG. 1 (FIG. 1A)), for the composite laminate structure 12 (see FIG. 1 (FIG. 1A)) containing the plurality of plies 28 (see FIG. 1 (FIG. 1A)).

As shown in FIG. 4, the method 150 further comprises step 154 of determining with the application interface 40 (see FIG. 1 (FIG. 1A)) executed by the processor 30 (see FIG. 1 (FIG. 1A)), an initial layup sequence 56a (see FIG. 1 (FIG. 1A)) defining parameters 58 (see FIG. 1 (FIG. 1A)) comprising a fiber orientation angle 60 (see FIG. 1 (FIG. 1A)) for each ply 28a (see FIG. 3), and a total percentage of plies 62 (see FIG. 1 (FIG. 1A)) at a given fiber orientation angle 60 (see FIG. 1 (FIG. 1A)) in the composite laminate structure 12 (see FIG. 1 (FIG. 1A)). The step 154 of determining the initial layup sequence 56a (see FIG. 1 (FIG. 1A)) comprises determining the initial layup sequence 56a (see FIG. 1 (FIG. 1A)) defining parameters 58 (see FIG. 1 (FIG. 1A)) comprising fiber orientation angles 60 (see FIG. 1 (FIG. 1A)) of zero degree (0°) fiber orientation angles 60a (see FIG. 1 (FIG. 1A)), ninety degree (90°) fiber orientation angles 60b (see FIG. 1 (FIG. 1A)), and plus or minus forty-five degree (+/−45°) fiber orientation angles 60c (see FIG. 1 (FIG. 1A)).

As shown in FIG. 4, the method 150 comprises step 156 of using with the application interface 40 (see FIG. 1 (FIG. 1A)) executed by the processor 30 (see FIG. 1 (FIG. 1A)), an analysis system 70 (see FIG. 1 (FIG. 1B)) for iteratively adjusting the parameters 58 (see FIG. 1 (FIG. 1A)), until an optimum set of parameters 58a (see FIG. 1) is obtained.

Preferably, the optimum set of parameters 58*a* (see FIG. 1 (FIG. 1B)) achieves one or more predetermined margins of safety 74 (see FIG. 1 (FIG. 1B)) for the composite laminate structure 12 (see FIG. 1 (FIG. 1A)) and achieves optimization of the composite laminate structure 12 (see FIG. 1 (FIG. 1A)), resulting in an optimized composite laminate structure 12*a* (see FIG. 1 (FIG. 1B)).

The step 156 of using the analysis system 70 (see FIG. 1 (FIG. 1B)) may comprise iteratively adjusting the parameters 58 (see FIG. 1 (FIG. 1A)) subject to design constraints 50. (see FIG. 1 (FIG. 1A)). The design constraints 50 (see FIG. 1 (FIG. 1A)) preferably comprise less than fifty percent (50%) of the total percentage of plies 62 (see FIG. 1 (FIG. 1A)) containing a zero degree (0°) fiber orientation angle 60*a* (see FIG. 1 (FIG. 1A)), less than sixty percent (60%) of the total percentage of plies 62 (see FIG. 1 (FIG. 1A)) containing a plus or minus forty-five degree (+/−45°) fiber orientation angle 60*c* (see FIG. 1 (FIG. 1A)), and more than ten percent (10%) of the total percentage of plies 62 (see FIG. 1 (FIG. 1A)) containing a ninety degree (90°) fiber orientation angle 60*b* (see FIG. 1 (FIG. 1A)).

The step 156 of using the analysis system 70 (see FIG. 1) may further comprise the step of using an integrated analysis tool 72 (see FIG. 1) configured to operably calculate the one or more predetermined margins of safety 74 (see FIG. 1). The one or more predetermined margins of safety 74 (see FIG. 1) preferably comprise a predetermined stress margin of safety 74*a* (see FIG. 1) and a predetermined strain margin of safety 74*b* (see FIG. 1), based on one or more predefined design rules 76 (see FIG. 1).

The step 156 of using the analysis system 70 (see FIG. 1 (FIG. 1B)) may further comprise the step of exporting the one or more predetermined margins of safety 74 (see FIG. 1 (FIG. 1B)) from the integrated analysis tool 72 (see FIG. 1 (FIG. 1B)) to an optimization tool 82 (see FIG. 1 (FIG. 1B)) for optimization. The step 156 of using the analysis system 70 (see FIG. 1 (FIG. 1B)) may further comprise the step of using in the optimization tool 82 (see FIG. 1 (FIG. 1B)), an optimization algorithm 84 (see FIG. 1 (FIG. 1B)) configured to operably obtain optimization tool results 86 (see FIG. 1 (FIG. 1B)) to test for convergence 88 (see FIG. 1 (FIG. 1B)). The optimization algorithm 84 (see FIG. 1 (FIG. 1B)) preferably comprises a genetic algorithm 84*a* (see FIG. 1 (FIG. 1B)).

The step 156 of using the analysis system 70 (see FIG. 1 (FIG. 1B)) may further comprise the step of testing the optimization tool results 86 (see FIG. 1 (FIG. 1B)) for convergence 88 (see FIG. 1 (FIG. 1B)). As shown in FIG. 1 (FIG. 1B), if convergence 88 is achieved as indicated by a "YES" answer 90, then optimization complete 92 is indicated and the output file 100 is generated. When the optimization is complete, a final layup sequence 56*b* (see FIG. 1 (FIG. 1B)) may be obtained and reported. Further, as shown in FIG. 1 (FIG. 1B), if convergence 88 is not achieved as indicated by a "NO" answer 94, then action 96 of update design variables 46 is indicated, and action 98 of repeat design cycle 99 is indicated, and one or more design cycles 99 may be repeated until convergence 88 is achieved.

As shown in FIG. 4, the method 150 comprises step 158 of generating with the application interface 40 (see FIG. 1 (FIG. 1A)) executed by the processor 30 (see FIG. 1 (FIG. 1A)), an output file 100 (see FIG. 1 (FIG. 1B)) for creating a layup of the optimized composite laminate structure 12*b* (see FIG. 1 (FIG. 1B)), according to the parameters 58 (see FIG. 1 (FIG. 1A)). The method 150 may further comprise after the generating step 158, the optional step of parallelization of the optimization process to speed up or expedite the global optimization process and process time, and expedite the convergence 88 (see FIG. 1 (FIG. 1B)).

As shown in FIG. 4, the method 150 comprises step 160 of automatically laying up the plurality of plies 28 (see FIG. 1 (FIG. 1B)) or manually laying up the plurality of plies 28 (see FIG. 1 (FIG. 1B)) for creating the layup of the optimized composite laminate structure 12*b* (see FIG. 1 (FIG. 1B)), according to the output file 100 (see FIG. 1 (FIG. 1B)) and the parameters 58 (see FIG. 1 (FIG. 1A)).

As shown in FIG. 4, the method 150 may further optionally comprise after the step 154 of determining the initial layup sequence 56*a* (see FIG. 1 (FIG. 1A)), the step 162 of using with the application interface 40 (see FIG. 1 (FIG. 1A)) executed by the processor 30 (see FIG. 1 (FIG. 1A)), a conversion software 66 (see FIG. 1 (FIG. 1B)) configured to operably convert data 57 (see FIG. 1 (FIG. 1A)) for the initial layup sequence 56*a* (see FIG. 1 (FIG. 1A)) to an analysis system format 68 (see FIG. 1 (FIG. 1B)) for use in the analysis system 70 (see FIG. 1 (FIG. 1B)).

Figure 5:
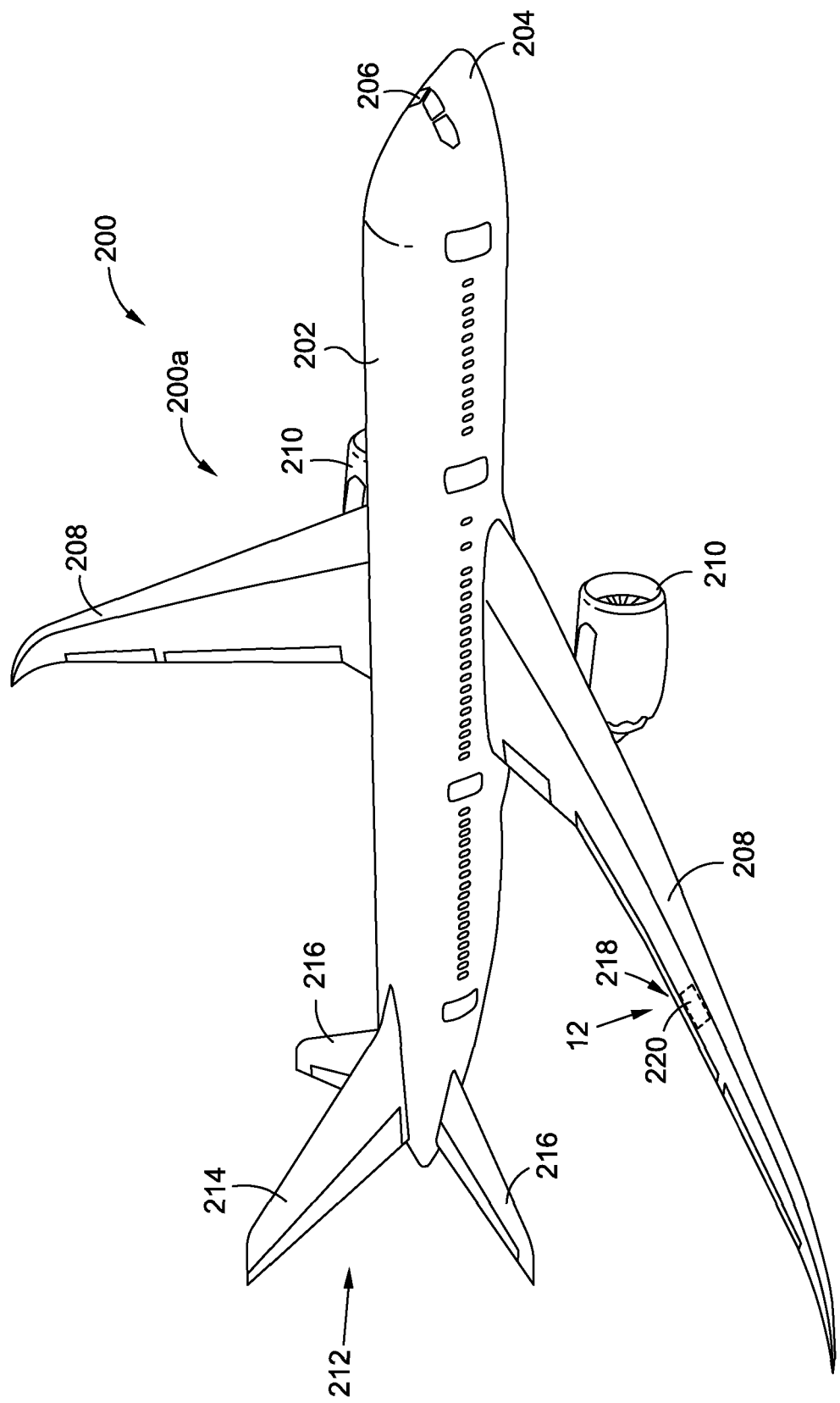
FIG. 5 is an illustration of a perspective view of an aircraft that may be measured using one of the embodiments of the calibration system and method of the disclosure.

FIG. 5 is an illustration of a perspective view of an air vehicle 200, such as an aircraft 200*a*, that includes one or more composite laminate structures 12, such as, for example a composite laminate wing skin 218, in the form of a wing skin panel 220, that may be designed using one of the embodiments of the system 10 and method 150 of the disclosure. As shown in FIG. 5, the aircraft 200*a* comprises such components as a fuselage 202, a nose 204, a cockpit 206, wings 208, one or more propulsion units 210, and a tail 212 comprising a vertical tail portion 214 and horizontal tail portions 216.

Although the aircraft 200*a* shown in FIG. 5 is generally representative of a commercial passenger aircraft having one or more composite laminate structures 12, such as, for example a composite laminate wing skin 218, in the form of wing skin panel 220, the teachings of the disclosed embodiments may be applied to other passenger aircraft. For example, the teachings of the disclosed embodiments may be applied to cargo aircraft, military aircraft, rotorcraft, and other types of aircraft or aerial vehicles, as well as aerospace vehicles, satellites, space launch vehicles, rockets, and other aerospace vehicles.

Figure 6:
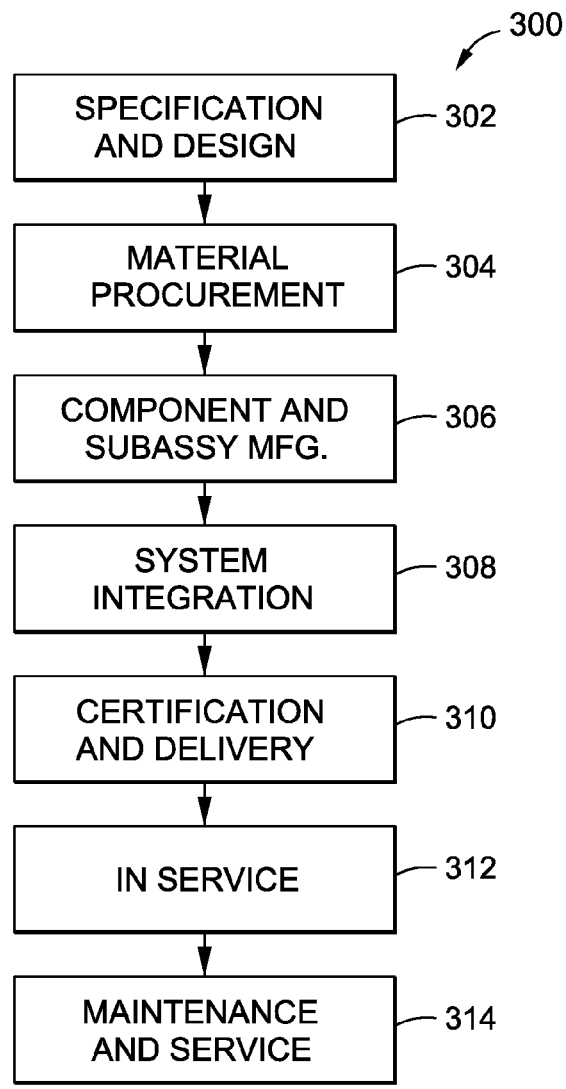
FIG. 6 is an illustration of a flow diagram of an aircraft production and service method; and, FIG. 7 is an illustration of a block diagram of an aircraft.
Figure 7:
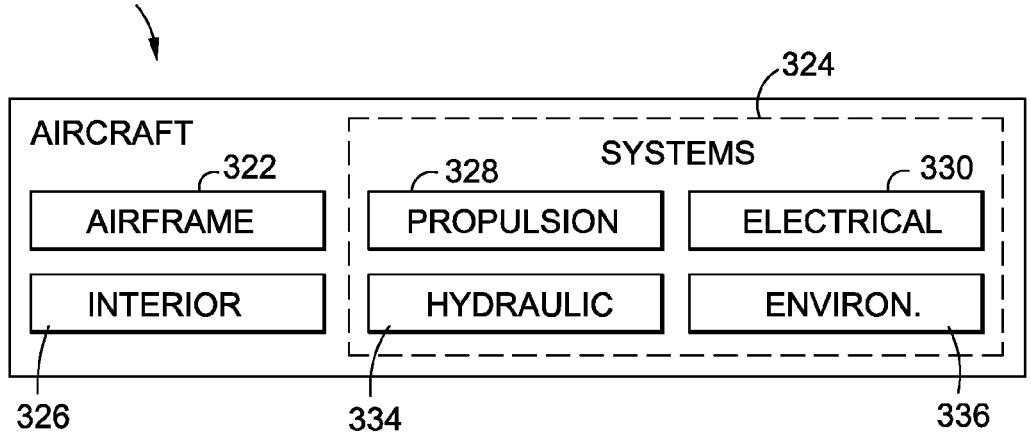

FIG. 6 is an illustration of a flow diagram of an aircraft manufacturing and service method 300. FIG. 7 is an illustration of a block diagram of an aircraft 320. Referring to FIGS. 6-7, embodiments of the disclosure may be described in the context of the aircraft manufacturing and service method 300 as shown in FIG. 6, and the aircraft 320 as shown in FIG. 7.

During pre-production, exemplary aircraft manufacturing and service method 300 may include specification and design 302 of the aircraft 320 and material procurement 304. During manufacturing, component and subassembly manufacturing 306 and system integration 308 of the aircraft 320 takes place. Thereafter, the aircraft 320 may go through certification and delivery 310 in order to be placed in service 312. While in service 312 by a customer, the aircraft 320 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 7, the aircraft 320 produced by the exemplary aircraft manufacturing and service method 300 may include an airframe 322 with a plurality of systems 324 and an interior 326. Examples of the plurality of systems 324 may include one or more of a propulsion system 328, an electrical system 330, a hydraulic system 332, and an environmental system 334. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 320 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 320. Similarly, one or more of apparatus embodiments, method embodiments, or a combination thereof, may be utilized while the aircraft 320 is in service 312, for example and without limitation, to maintenance and service 314.

Disclosed embodiments of the system 10 (see FIG. 1) and method 150 (see FIG. 4) provide optimization for composite laminate structures 12 (see FIG. 1) using a non-finite element model system 10a (see FIG. 1) and a non-finite element model method 150a (see FIG. 4) that do not require the use of finite element modeling software utilizing a finite element model (FEM). Thus, disclosed embodiments of the system 10 (see FIG. 1) and the method 150 (see FIG. 4) may be used to bypass finite element modeling analysis and calculate predetermined stress margins of safety 74 (see FIG. 1 (FIG. 1B)) or calculate stress failures margins, and may have improved user friendliness over known systems and methods that require the use of finite element modeling software utilizing a finite element model (FEM).

In addition, with disclosed embodiments of the system 10 (see FIG. 1) and method 150 (see FIG. 4), users have the ability to specify the maximum number of plies 44 (see FIG. 1 (FIG. 1A)), design variables 46 (see FIG. 1 (FIG. 1A)), material properties 48 (see FIG. 1 (FIG. 1A)), and design constraints 50 (see FIG. 1 (FIG. 1A)) as an input file 42 (see FIG. 1 (FIG. 1A)) to minimize weight of the composite laminate structure 12 (see FIG. 1). Moreover, with disclosed embodiments of the system 10 (see FIG. 1) and method 150 (see FIG. 4), users have the ability to define the parameters 58 (see FIG. 1 (FIG. 1A)) of fiber orientation angle 60 (see FIG. 1 (FIG. 1A)) for each ply 28a (see FIG. 3), and the total percentage of plies 62 (see FIG. 1 (FIG. 1A)) at each given fiber orientation angle 60 (see FIG. 1 (FIG. 1A)) in the composite laminate structure 12 (see FIG. 1).

Further, with disclosed embodiments of the system 10 (see FIG. 1) and method 150 (see FIG. 4), users have the ability to converge to a global optimum solution 36 (see FIG. 1 (FIG. 1B)) or a local optimum solution 38 (see FIG. 1 (FIG. 1B)) for the composite optimization of any configuration and parts for the composite laminate structures 12 (see FIG. 1), and have the ability to find the global optimum solution 36 (see FIG. 1 (FIG. 1B)) from all other local minimum, which may save weight, and in turn, may result in decreased design and manufacturing costs. The system 10 (see FIG. 1) and method 150 (see FIG. 4) are automated to find the global optimum solution 36 (see FIG. 1 (FIG. 1B)) or the local optimum solution 38 (see FIG. 1 (FIG. 1B)), and report final layup sequences 56b (see FIG. 1 (FIG. 1B)), fiber orientation angles 60 (see FIG. 1 (FIG. 1A)), and total percentage of plies 62 (see FIG. 1 (FIG. 1A)) to minimize an objective function and satisfy design constraints 50 (see FIG. 1 (FIG. 1A)).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system for creating an optimized composite laminate structure containing
a plurality of plies, the system comprising:
a processor;
a memory in communication with the processor, including an application interface which, when executed by the processor, is configured to operably:
receive an input file comprising one or more of a maximum number of plies, design variables, material properties, and design constraints, for a composite laminate structure containing the plurality of plies;
determine an initial layup sequence defining parameters comprising a fiber orientation angle for each ply, and a total percentage of plies at a given fiber orientation angle in the composite laminate structure;
iteratively adjust the parameters subject to design constraints comprising less than fifty percent (50%) of the total percentage of plies containing a zero degree (0.degree.) fiber orientation angle, less than sixty percent (60%) of the total percentage of plies containing a plus or minus forty-five degree (+/−45.degree.) fiber orientation angle, and more than ten percent (10%) of the total percentage of plies containing a ninety degree (90.degree.) fiber orientation angle, until an optimum set of parameters is obtained that achieves one or more predetermined margins of safety for the composite laminate structure, and that achieves optimization of the composite laminate structure, resulting in the optimized composite laminate structure; and generate an output file for creating a layup of the optimized composite laminate structure, according to the parameters; and
a layup system configured to operably lay up the plurality of plies for creating the optimized composite laminate structure, according to the output file and the parameters.

2. The system of claim 1 wherein the application interface is further configured to operably use an analysis system comprising: an integrated analysis tool configured to operably calculate the one or more predetermined margins of safety for the composite laminate structure; and, an optimization tool configured to operably receive the one or more predetermined margins of safety from the integrated analysis tool, to operably achieve optimization of the composite laminate structure, and to operably generate the output file, wherein the optimization tool comprises an optimization algorithm to obtain optimization tool results to test for convergence, and if convergence is achieved, then optimization is complete and the output file is generated, and if convergence is not achieved, then design variables are updated and one or more design cycles are repeated until convergence is achieved.

3. The system of claim 2 further comprising a conversion software which, when executed by the processor, is operable to convert data for the initial layup sequence to an analysis system format for use in the integrated analysis tool of the analysis system.

4. The system of claim 2 wherein the one or more predetermined margins of safety calculated by the integrated analysis tool comprise a predetermined stress margin of safety and a predetermined strain margin of safety, based on one or more predefined design rules.

5. The system of claim 2 wherein the optimization algorithm is a genetic algorithm.

6. The system of claim 1 wherein the fiber orientation angle comprises one of a zero degree (0.degree.) fiber orientation angle, a ninety degree (90.degree.) fiber orientation angle, or a plus or minus forty-five degree (+/−45.degree.) fiber orientation angle.

7. The system of claim 1 wherein the system is a non-finite element model (non-FEM) system that does not require use of a finite element model (FEM), and further wherein the system is automated to find either a global optimum solution or a local optimum solution.

8. The system of claim 1 wherein the composite laminate structure comprises a composite laminate skin.

9. The system of claim 1 wherein the layup system comprises a manual layup system or an automated layup system.

10. The system of claim 9 wherein the automated layup system comprises a numerical control tow placement machine for creating the layup of the optimized composite laminate structure, according to the output file and the parameters.

11. A non-finite element model system for optimizing a composite laminate structure containing a plurality of plies, the system comprising:
a controller powered by a power element, the controller comprising a processor and a memory in communication with the processor;
an application interface coupled to the processor, which when executed by the processor, is configured to operably receive an input file comprising one or more of a maximum number of plies, design variables, material properties, and design constraints, for the composite laminate structure, and is further configured to operably determine an initial layup sequence defining parameters comprising a fiber orientation angle for each ply, and a total percentage of plies at a given fiber orientation angle, in the composite laminate structure; a conversion software which, when executed by the processor, is operable to convert data for the initial layup sequence to an analysis system format;
an analysis system configured to operably receive with the application interface the parameters and the data for the initial layup sequence, and iteratively adjust the parameters subject to design constraints comprising less than fifty percent (50%) of the total percentage of plies containing a zero degree (0.degree.) fiber orientation angle, less than sixty percent (60%) of the total percentage of plies containing a plus or minus forty-five degree (+/−45.degree.) fiber orientation angle, and more than ten percent (10%) of the total percentage of plies containing a ninety degree (90.degree.) fiber orientation angle, until an optimum set of parameters is obtained that achieves one or more predetermined margins of safety for the composite laminate structure, and that achieves optimization of the composite laminate structure, resulting in an optimized composite laminate structure; an output file generated by the analysis system for forming a layup of the optimized composite laminate structure, according to the parameters; and
an automated layup system or a manual layup system configured to operably lay up the plurality of plies for forming the optimized composite laminate structure, according to the output file and the parameters.

12. The system of claim 11 wherein the analysis system comprises:
an integrated analysis tool configured to operably calculate the one or more predetermined margins of safety for the composite laminate structure, wherein the one or more predetermined margins of safety comprise a predetermined stress margin of safety and a predetermined strain margin of safety, based on one or more predefined design rules; and, an optimization tool configured to operably receive the one or more predetermined margins of safety from the integrated analysis tool, to operably achieve optimization of the composite laminate structure, and to operably generate the output file, the optimization tool comprising an optimization algorithm to obtain optimization tool results to test for convergence, and if convergence is achieved, then optimization is complete and the output file is generated, and if convergence is not achieved, then design variables are updated and one or more design cycles are repeated until convergence is achieved.

13. A method executed by a processor for optimizing a composite laminate structure containing a plurality of plies, the method comprising the steps of:
receiving with an application interface executed by the processor, an input file comprising one or more of a maximum number of plies, design variables, material properties, and design constraints, for the composite laminate structure containing the plurality of plies;
determining with the application interface executed by the processor, an initial layup sequence defining parameters comprising a fiber orientation angle for each ply, and a total percentage of plies at a given fiber orientation angle in the composite laminate structure;
using with the application interface executed by the processor, an analysis system for iteratively adjusting the parameters subject to design constraints comprising less than fifty percent (50%) of the total percentage of plies containing a zero degree (0.degree.) fiber orientation angle, less than sixty percent (60%) of the total percentage of plies containing a plus or minus forty-five degree (+/−45.degree.) fiber orientation angle, and more than ten percent (10%) of the total percentage of plies containing a ninety degree (90.degree.) fiber orientation angle, until an optimum set of parameters is obtained that achieves one or more predetermined margins of safety for the composite laminate structure and that achieves optimization of the composite laminate structure, resulting in an optimized composite laminate structure;
generating with the application interface executed by the processor, an output file for creating a layup of the optimized composite laminate structure, according to the parameters; and automatically or manually laying up the plurality of plies for creating the layup of the optimized composite laminate structure, according to the output file and the parameters.

14. The method of claim 13 wherein the method is a non-finite element model (non-FEM) method that does not require use of a finite element model (FEM), and is automated to find either a global optimum solution or a local optimum solution.

15. The method of claim 13 wherein the step of determining the initial layup sequence comprises determining the initial layup sequence defining parameters comprising fiber orientation angles of zero degree (0.degree.) fiber orientation angles, ninety degree (90.degree.) fiber orientation angles, and plus or minus forty-five degree (+/−45.degree.) fiber orientation angles.

16. The method of claim 13 further comprising after the step of determining the initial layup sequence, the step of using with the application interface executed by the processor, a conversion software configured to operably convert data for the initial layup sequence to an analysis system format for use in the analysis system.

17. The method of claim 13 wherein the step of using the analysis system comprises the step of using an integrated analysis tool configured to operably calculate the one or more predetermined margins of safety comprising a predetermined stress margin of safety and a predetermined strain margin of safety, based on one or more predefined design rules.

18. The method of claim 17 wherein the step of using the analysis system further comprises the steps of: exporting the one or more predetermined margins of safety from the integrated analysis tool to an optimization tool for optimization; using in the optimization tool, an optimization algorithm configured to operably obtain optimization tool results to test for convergence; and testing the optimization tool results for convergence, and if convergence is achieved, then optimization is complete and the output file is generated, and if convergence is not achieved, then design variables are updated and one or more design cycles are repeated until convergence is achieved.

19. The system of claim 11 wherein the composite laminate structure comprises a composite laminate skin.

20. The method of claim 13 wherein the composite laminate structure comprises a composite laminate skin.

* * * * *